United States Patent [19]

Sunaoka et al.

[11] Patent Number: 5,209,852
[45] Date of Patent: May 11, 1993

[54] PROCESS FOR SCRUBBING POROUS HOLLOW FIBER MEMBRANES IN HOLLOW FIBER MEMBRANE MODULE

[75] Inventors: Yoshio Sunaoka, Higashimatsuyama; Keisuke Kitazato, Kumamoto; Satoru Tsuda, Niiza, all of Japan

[73] Assignee: Japan Organo Co. Ltd., Tokyo, Japan

[21] Appl. No.: 747,057

[22] Filed: Aug. 19, 1991

[30] Foreign Application Priority Data

Aug. 31, 1990 [JP] Japan .................................. 2-228106

[51] Int. Cl.⁵ ............................................. B01D 65/02
[52] U.S. Cl. ................................ 210/636; 210/321.69; 210/500.23
[58] Field of Search ............ 210/636, 650, 410, 321.69, 210/500.23

[56] References Cited

U.S. PATENT DOCUMENTS

| | | | |
|---|---|---|---|
| 3,794,169 | 2/1974 | Sisk et al. | 210/321.69 X |
| 3,992,301 | 11/1976 | Shippey et al. | 210/321.69 X |
| 4,253,962 | 3/1981 | Thompson | 210/321.69 X |
| 4,540,490 | 9/1985 | Shibata et al. | 210/321.69 X |
| 4,756,875 | 7/1988 | Tajima et al. | 210/500.23 X |
| 4,876,006 | 10/1989 | Ohkubo et al. | 210/321.69 |

OTHER PUBLICATIONS

Memorandom on Prior Art Statement, 2 pages., S. N. 757,857.

Primary Examiner—Frank Spear
Attorney, Agent, or Firm—Sprung Horn Kramer & Woods

[57] ABSTRACT

There is disclosed a process for scrubbing hollow fiber membranes in at least one hollow fiber membrane module disposed in a hollow fiber membrane filter column wherein the hollow fiber membrane module includes a large number of hollow fibers bundled together therein as the hollow fiber membranes. In the process, the filtration step of passing raw water through the pores of the hollow fibers from the outsides thereof to the insides thereof to thereby trap the fine particles on the outer surfaces of the hollow fibers is followed by the scrubbing step of charging bubbles into water around the outer surfaces of the hollow fibers to agitate the water to vibrate the hollow fibers, thereby exfoliating the fine particles trapped on the outer surfaces of the hollow fibers. This scrubbing is effected either in such a two stage manner that relatively coarse, hard, fine particles exfoliated in the initial stage of the scrubbing step is removed, followed by second-stage scrubbing, or by carrying out the scrubbing step while simultaneously removing the relatively coarse, hard, fine particles exfoliated in the initial stage of the scrubbing step. The scrubbing step is followed by the drain step of draining the resulting waste water out of the system.

8 Claims, 4 Drawing Sheets

PROCESS FOR SCRUBBING POROUS HOLLOW FIBER MEMBRANES IN HOLLOW FIBER MEMBRANE MODULE

BACKGROUND OF THE INVENTION

1. Field of the Invention

The present invention relates to a process for scrubbing porous hollow fiber membranes in a hollow fiber membrane module(s) disposed in a hollow fiber membrane filter column, which is used to treat condensate water obtained in a nuclear or thermoelectric power plant as well as industrial waste water or the like.

2. Prior Art

In general, a hollow fiber membrane filter column comprises a number of hollow fiber membrane modules including a large number of porous hollow fibers bundled together therein. The hollow fiber membrane modules are juxtaposed with each other generally in a state of being hung from a module support laterally provided in the filter column. The filtration of raw water is effected by feeding raw water into a lower compartment partitioned with the module support to allow the raw water to permeate through the pores of the hollow fiber membranes from the outsides of the hollow fibers to the insides thereof. Fine particles in the raw water are trapped on the outer surfaces of the hollow fibers, while filtrate obtained on the insides of the hollow fibers is gathered in an upper compartment partitioned with the module support and is then drained out of the filter column.

When the differential pressure, or pressure drop, across the filter column is increased to some level through the step of such filtration, bubbles are charged into water around the outer surfaces of the hollow fibers dipped in water to cause agitation of the water with which the hollow fiber membranes are vibrated to exfoliate the fine particles trapped on the outer surfaces of the hollow fibers. This step, which is called a "scrubbing step," is followed by the drain step of discharging from the lower compartment the waste water resulted from the scrubbing and containing the exfoliated fine particles. Thus, the operation of the filter column involves the filtration step, the scrubbing step and the drain step.

Additionally stated, the backwash step of inversely flowing washing water from the insides of the hollow fibers to the outsides thereof may sometimes be taken before, during or after the scrubbing step.

As means for charging bubbles such as air bubbles around the outer surfaces of the hollow fibers, there can be mentioned release of a gas such as air on the lower side of the hollow fiber membrane modules to charge air bubbles into the insides of the hollow fiber membrane modules, and injection of a compressed gas such as compressed air into the central bores of the hollow fibers to release the gas through the pores of the hollow fiber membranes to form bubbles around the outer surfaces of the hollow fibers. The former is employed in most cases where use is made of hollow fiber membranes having such fine pores as to hardly allow a gas to pass therethrough, while the latter is employed in most cases where use is made of hollow fiber membranes having such fine membrane pores as to allow a gas to easily pass therethrough.

Thus, the filter column using hollow fiber membranes is basically operated by repeating the filtration step, the scrubbing step and the drain step. Accordingly, sufficient care is needed to ensure that continuation of filtration is not obstructed simply because fine particles trapped on the outer surfaces of the hollow fibers are accumulated to raise the differential pressure across the filter column.

Therefore, investigations, tests and developments have heretofore been made of the structures of hollow fiber membrane modules, the structures of filter coulmns, methods of washing hollow fiber membranes by scrubbing in particular, etc. with an eye to preventing fine particles from accumulating while trapped on the outer surfaces of hollow fibers.

The authors of the present invention have made efforts as well to develop a process for effectively washing hollow fiber membranes in hollow fiber membrane modules disposed in a filter column. They have found out, however, that, in some cases of treating such raw water containing fine iron oxide particles as condensate water obtained, for example, in a BWR nuclear power plant, the differential pressure across a hollow fiber membrane module, increased through the filtration step, is not reverted to the original one even when the module is subjected to the aforementioned scrubbing and backwash steps or even when those scrubbing and backwash steps are further followed by subjecting the hollow fiber membrane module to the step of washing hollow fiber membranes with an acid to dissolve and remove therefrom the iron oxides adhering to the outer surfaces of the hollow fiber membranes.

With a view to looking into the causes of the foregoing phenomenon, the authors of the present invention have made various investigations and experiments, as a result of which the following have been elucidated:

(1) A cause for non-reversion of the differential pressure is lowering of the water permeability of the hollow fiber membranes themselves, not due to compaction and/or crush of the hollow fiber membranes owing to the pressure differential between the outside and inside thereof.

(2) Only the outer surface portions of the hollow fibers are, so to speak, roughened such that most pores originally present are occluded to considerably decrease the number of open pores all across the hollow fiber membranes.

(3) The roughened state of the outer surface portions of the hollow fibers does not change even when the hollow fibers are washed with a chemical such as an acid, an oxidizing agent or a reducing agent.

(4) The non reversion of the differential pressure is not a result of deterioration of such physical properties of the hollow fibers as manifested in terms of lowerings of their mechanical strengths such as tensile strength, tensile elongation and crushing strength.

As a result of further investigations and experiments, the following have futher been elucidated.

(5) The outer surface portions of the hollow fibers are roughened through collision thereagainst of fine particles such as iron oxide particles.

(6) The collision of the fine particles against the outer surfaces of the hollow fibers occurs when the fine particles exist between the hollow fibers being vibrated.

(7) The above-mentioned collision is liable to occur most frequently in the step of scrubbing the hollow fiber membranes.

(8) The fine particles such as iron oxide particles which are relatively coarse and hard (hereinafter referred to as "relatively coarse, hard, fine particles")

have been found out to be predominantly involved in the roughening of the outer surface portions of the hollow fibers.

(9) In an environment where fine iron oxide particles contained in such raw water as condensate water having a low iron oxide particle content and obtained in a BWR nuclear power plant in particular are trapped on the outer surfaces of hollow fibers over a long period of time while iron ions existing along with the fine iron oxide particles are adsorbed and deposited in the layer of the trapped fine iron oxide particles, fine iron oxide particles, even if very fine, in raw water are grown into firm granules on the outer surfaces of the hollow fibers. Therefore, fine iron oxide particles exfoliated off the hollow fiber membranes in the scrubbing step in the case of the above-mentioned environment naturally include relatively coarse, hard, fine particles as mentioned above.

(10) Such relatively coarse, hard, fine particles are exfoliated in the initial stage of the scrubbing step.

The present invention has been made based on these findings.

Accordingly, an object of the present invention is to provide a process for scrubbing porous hollow fiber membranes in at least one hollow fiber membrane module generally disposed in a filter column, according to which the influence of relatively coarse, hard, fine particles on hollow fibers to roughen the outer surface portions (hereinafter often referred to in brief as the "outer surfaces") thereof can be suppressed as much as possible without adversely affecting exfoliation of fine particles trapped on the outer surfaces of the hollow fibers.

SUMMARY OF THE INVENTION

In accordance with the present invention, there is provided a process for scrubbing porous hollow fiber membranes in a hollow fiber membrane module including a large number of hollow fibers bundled together therein as the porous hollow fiber membranes: comprising the filtration step of passing raw water containing fine particles through the pores of the hollow fibers from the outsides thereof to the insides thereof to trap the fine particles on the outer surfaces of the hollow fibers while draining filtrate obtained on the insides of the hollow fibers out of the hollow fiber membrane module, the scrubbing step of charging bubbles into water around the outer surfaces of the hollow fibers dipped in water to agitate the water around the outer surfaces of the hollow fibers to vibrate the hollow fibers, thereby exfoliating the fine particles trapped on the outer surfaces of the hollow fibers, and the drain step of draining the resulting waste water containing the exfoliated fine particles out of the hollow fiber membrane module;

wherein fine particles exfoliated off the outer surfaces of the hollow fibers in the initial stage of the scrubbing step are removed before further continuation of the scrubbing step.

Generally speaking, the above-mentioned hollow fiber membrane module is usually disposed along with at least one hollow fiber membrane module of the same kind as described above in a hollow fiber membrane filter column while being hung from a module support partitioning the inside of the hollow fiber membrane filter column into an upper compartment, from which the filtrate drained out of the hollow fiber membrane modules is discharged out of the filter column, and a lower compartment, into which the raw water is flowed before passed through the pores of the hollow fibers and from which the waste water drained out of the hollow fiber membrane modules is discharged out of the filter column.

In this case, the number of hollow fiber membrane modules disposed in the filter column may be determined depending upon various conditions such as the kind and amount of raw water to be subjected to filtration, and the type and capacity of the hollow fiber membrane modules. In general, however, the number of hollow fiber membrane modules may be in the range of 1 to 30, preferably 3 to 20, in the case of industrial waste water or the like, and in the range of 80 to 500, preferably 100 to 300, in the case of condensate water or the like.

In accordance with the present invention, there is also provided a process for scrubbing porous hollow fiber membranes in a hollow fiber membrane module including a large number of hollow fibers bundled together therein as the porous hollow fiber membranes: comprising the filtration step of passing raw water containing fine particles through the pores of the hollow fibers from the outsides thereof to the insides thereof to trap the fine particles on the outer surfaces of the hollow fibers while draining filtrate obtained on the insides of the hollow fibers out of the hollow fiber membrane module, the scrubbing step of charging bubbles into water around the outer surfaces of the hollow fibers dipped in water to agitate the water around the outer surfaces of the hollow fibers to vibrate the hollow fibers, thereby exfoliating the fine particles trapped on the outer surfaces of the hollow fibers, and the drain step of draining the resulting waste water containing the exfoliated fine particles out of the hollow fiber membrane module;

wherein the preliminary drain step of draining waste water containing fine particles exfoliated off the outer surfaces of the hollow fibers in the initial stage of the scrubbing step is added in the course of the scrubbing step to simultaneously effect scrubbing of the porous hollow fiber membranes and drain of the waste water in the initial stage of the scrubbing step.

Generally speaking, the above-mentioned hollow fiber membrane module is usually disposed along with at least one hollow fiber membrane module of the same kind as described above in a hollow fiber membrane filter column while being hung from a module support partitioning the inside of the hollow fiber membrane filter column into an upper compartment, from which the filtrate drained out of the hollow fiber membrane modules is discharged out of the filter column, and a lower compartment, into which the raw water is flowed before passed through the pores of the hollow fibers and from which the waste water drained out of the hollow fiber membrane modules is discharged out of the filter column.

In this case, the number of hollow fiber membrane modules disposed in the filter column may be determined depending upon various conditions such as the kind and amount of raw water to be subjected to filtration, and the type and capacity of the hollow fiber membrane modules. In general, however, the number of hollow fiber membrane modules may be in the range of 1 to 30, preferably 3 to 20, in the case of industrial waste water or the like, and in the range of 80 to 500, preferably 100 to 300, in the case of condensate water or the like.

DETAILED DESCRIPTION

Ideas that may naturally come to the mind of one skilled in the art if he wants to avoid the problem of occulusion of the innate pores of hollow fiber membranes through collision thereagainst of relatively coarse, hard, fine particles, will be that the time of the scrubbing step liable to cause outer surface roughening of hollow fibers is shortened, that the flow rate of air being charged for scrubbing is decreased to effect mild scrubbing, and that the scrubbing step is dispensed with. According to any one of the foregoing ideas, however, fine particles trapped on the outer surfaces of the hollow fibers cannot be sufficiently removed, resulting in such unsatisfactory washing thereof as to be frequently unable to revert the differential pressure to the substantially original one.

Accordingly, how to suppress the outer surface roughening of hollow fibers must be contrived without resort to dispensing with such scrubbing as has heretofore been employed. In view of this, the scrubbing step itself must be a target of contrivance to minimize the unfavorable effect of relatively coarse, hard, fine particles most causative of roughening the outer surfaces of the hollow fibers on which such fine particles are trapped.

According to the present invention, collision of relatively coarse, hard, fine particles against the outer surfaces of hollow fibers is minimized to prevent the outer surfaces of the hollow fiber from being roughened with the relatively coarse, hard, fine particles. This can be basically achieved by removing relatively coarse, hard, fine particles exfoliated in the initial stage of the scrubbing step (hereinafter often referred to as "first stage scrubbing") before further continuation of the scrubbing step (hereinafter often referred to as "second stage scrubbing"), or by carrying out the scrubbing step while simultaneously removing the relatively coarse, hard, fine particles exfoliated in the initial stage of the scrubbing step.

BRIEF DESCRIPTION OF THE DRAWINGS

The foregoing and other objects, features and advantages of the present invention will be better understood from the following description taken in connection with the accompanying drawings, in which:

In FIGS. 4 and 5, the ordinate represents the differential pressure increment, while the abscissa represents the number of cycles of passing raw water through the filter column and subsequently scrubbing porous hollow fiber membranes in the hollow fiber membrane module disposed in the filter column.

BEST MODES FOR CARRYING OUT THE INVENTION

The present invention will now be described in detail while referring to the accompanying drawings.

[Embodiment 1 according to the Present Invention]

Figure 1:
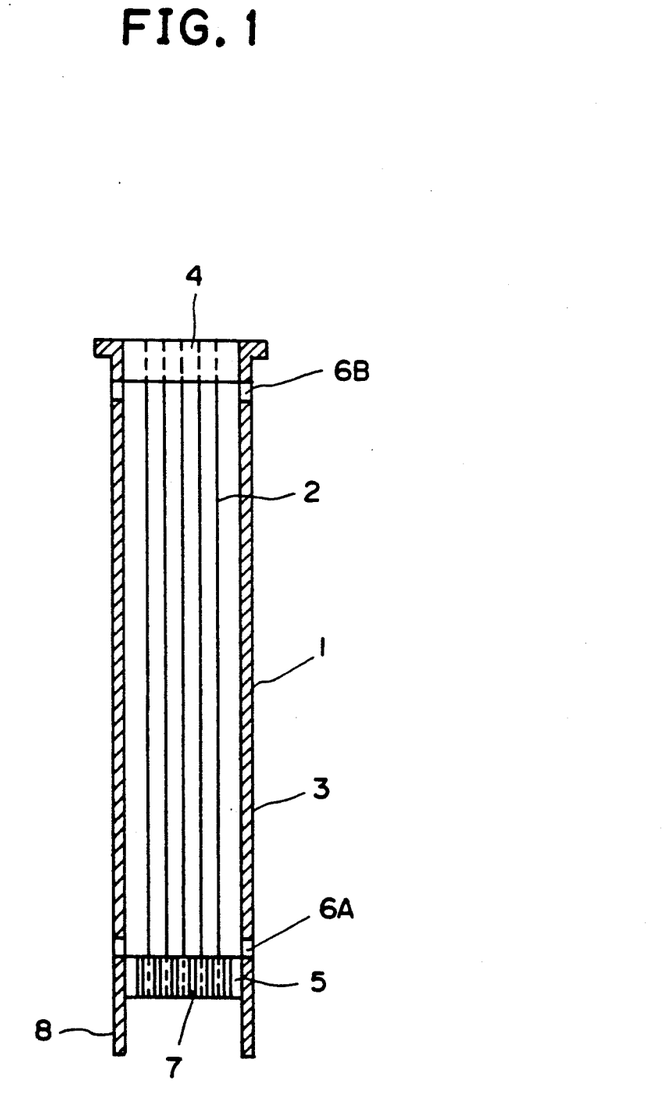
FIG. 1 is a cross-sectional view of an example of a hollow fiber membrane module to be used in the present invention.
Figure 2:
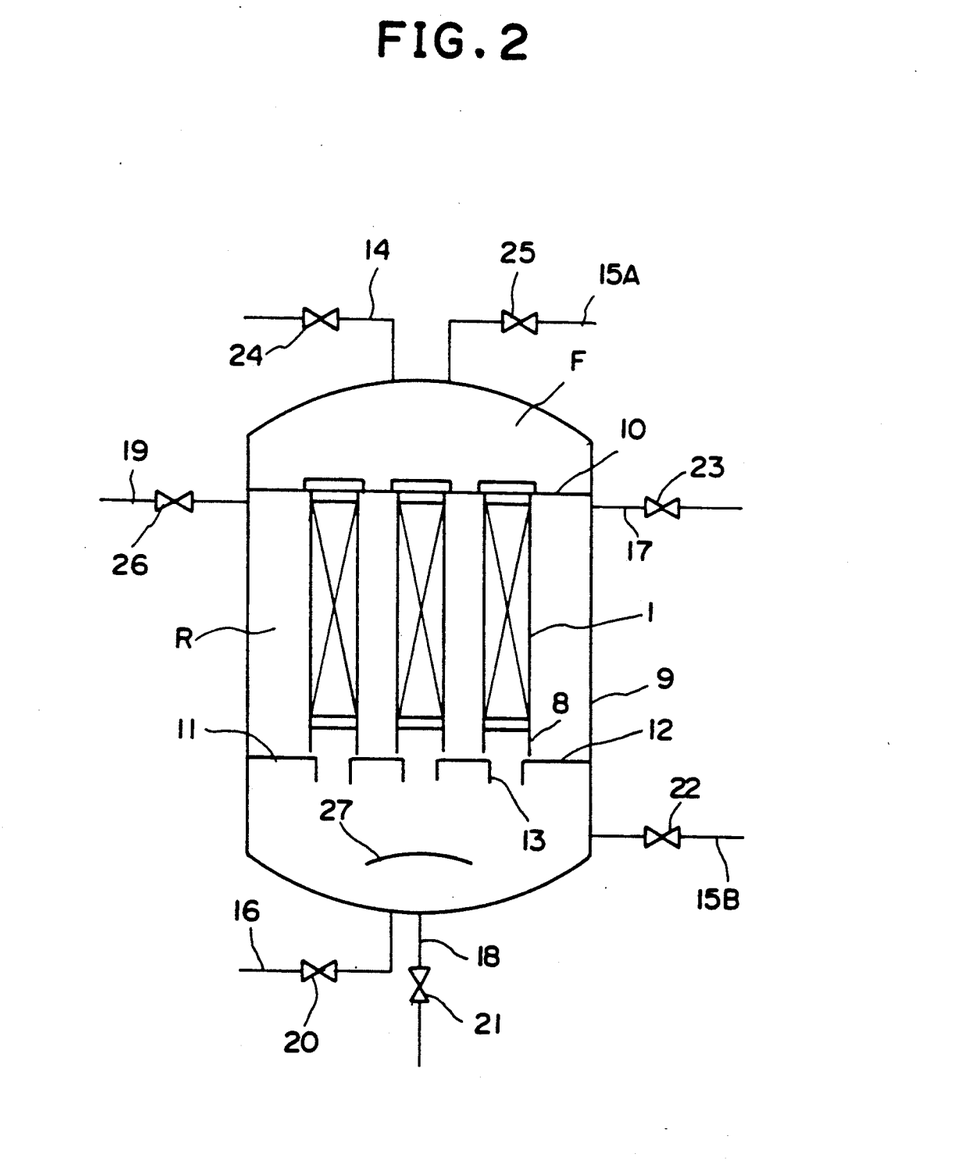
FIG. 2 is an illustration of an example of a filter column to be used in the present invention.

FIG. 1 is a cross-sectional view of an example of a hollow fiber membrane module to be used in the present invention, while FIG. 2 is an illustration of an example of a filter column to be used in the present invention.

As shown in FIG. 1, the hollow fiber membrane module 1 that may be used in the present invention comprises a cylinder 3 including about 100 to about 50,000 porous hollow fibers 2 having pores of 0.01 $\mu$m to 1 $\mu$m in size, an outer diameter of 0.3 to 4 mm and an inner diameter of 0.2 to 3 mm. The upper end portions of the hollow fibers 2 are bound, or potted, without occlusion of the central bores of the hollow fibers 2 to form an upper joint 4. The lower end portions of the hollow fibers 2 are bound in such a way as to occlude the lower ends of the central bores of the hollow fibers 2 to form a lower joint 5. The lower and upper portions of the cylinder 3 are provided with communication ports 6A and 6B, respectively. The lower joint 5 is provided with apertures 7. The cylinder 3 extends downwardly beyond the lower joint 5 to be provided with a skirt 8.

Additionally stated, the foregoing hollow fiber membrane module is of a through-one-end water collection type wherein filtrate obtained on the inside of each hollow fiber is collected only through the upper joint 4. Alternatively, use may be made of a through-both-ends water collection type hollow fiber membrane module wherein the hollow fibers 2 are bound at the lower joint 5 without occlusion of the central bores of the hollow fibers 2 while a small chamber, not shown in FIG. 1, is provided on the lower side of the lower joint 5, and wherein filtrate is also collected through the lower joint 5 of the hollow fibers 2 into the above-mentioned small chamber from which the filtrate is sent upwardly through a water collection tube, not shown in FIG. 1, which is longitudinally installed along the hollow fibers 2 and in flow communication with the small chamber.

As shown in FIG. 2, the filter column 9 is provided with a number of such hollow fiber membrane modules 1 juxtaposed with each other and hung from a module support 10, which is provided at an upper part of the inside of the filter column 9 and partitions the inside of the filter column 9 into an upper compartment F and a lower compartment R.

A bubble distribution mechanism is provided at a lower part of the inside of the filter column 9. The bubble distribution mechanism 11 is constituted of an air distributor panel 12 and bubble distributor tubes 13 attached to the air distributor panel 12 and positioned just under the corresponding skirts 8 of the hollow fiber membrane modules 1.

The upper portion of the filter column 9 is in flow communication with one end of a filtrate drain piping 14 and with one end of a compressed air charge piping 15A. The lower portion of the filter column 9 is in flow communication with one end of a raw water feed piping 16, with one end of a compressed air charge piping 15B and with one end of a drain piping 18. The side trunk of the filter column 9, just under the module support 10, is in flow communication with one end of an air discharge piping 17 and with one end of a water replenishment piping 19.

The pipings are provided with respective valves 20 to 26. A baffle plate 27 is positioned near the bottom of the filter column 9.

The process of the present invention, using the filter column 9, will now be described in detail while taking condensate water containing iron oxide particles as an example of the object of treatment.

Figure 3:
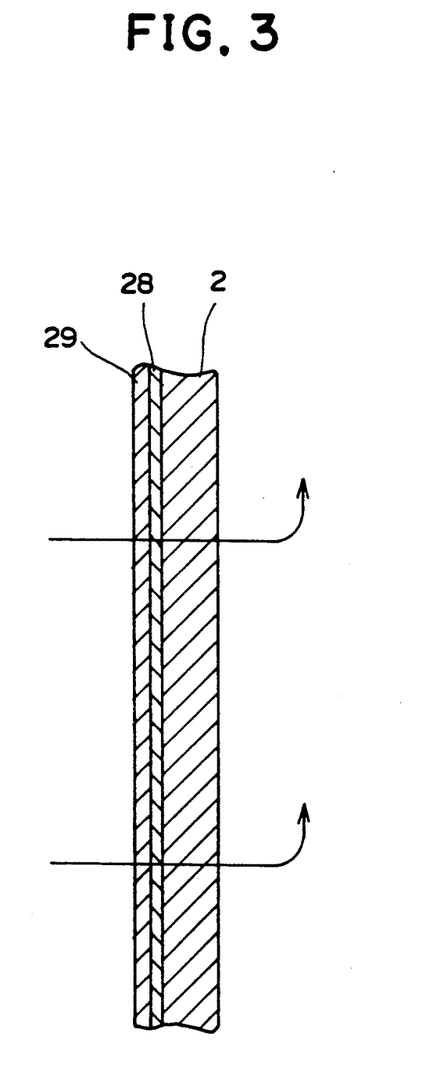
FIG. 3 is an enlarged illustration of a porous hollow fiber membrane just in the course of filtration.

In the filtration step, the valves 20 and 24 are opened to feed raw water into the lower compartment R through the raw water feed piping 16. Iron oxide particles contained in the raw water are filtered off by means of the hollow fiber membrane modules 1, while filtrate is gathered in the upper compartment F and then drained through the filtrate drain piping 14. As shown in FIG. 3, the iron oxide particles filtered off with a hollow fiber membrane 2 are formed into an iron oxide layer 28 and an iron oxide layer 29 which adhere onto the outer surface of the hollow fiber membrane 2. Arrow-headed lines in FIG. 3 indicate the direction of flow of raw water into and through the central bore of the hollow fiber.

In FIG. 3, the iron oxide layer 28 is a dense layer mainly composed of relatively fine iron oxide particles so relatively strongly adhering to the outer surface of the hollow fiber membrane 2 that the layer 28 may be hard to exfoliate unless sufficient scrubbing is effected. This iron oxide layer 28 is gradually built up as filtration is repeated alternately with scrubbing. The build-up of this layer 28 is usually a great factor in increasing the differential pressure in filtration after scrubbing.

On the other hand, the iron oxide layer 29 is a coarse layer mainly composed of relatively large iron oxide particles so weakly adhering to the outside of the iron oxide layer 28 that the layer 29 may be easy of exfoliation unlike the iron oxide layer 28. This layer 29 include most of relatively coarse, hard, fine particles causative of roughening the outer surfaces of hollow fiber membranes. Usually, most of iron oxide particles trapped on the outer surfaces of the hollow fiber membranes are included in the iron oxide layer 29.

The present invention that have been made with an eye to making the best of relative easiness of exfoliation inherent in relatively coarse, hard, fine particles causative of roughening the outer surfaces of hollow fiber membranes, is characterized in that relatively coarse, hard, fine particles, or the iron oxide layer 29, relatively easy of exfoliation is removed in the initial stage of the scrubbing step, followed by sufficient scrubbing to remove the iron oxide layer 28 hard of easy exfoliation, whereby roughening of the outer surfaces of the hollow fiber membranes can be kept back.

The scrubbing step is taken to remove the iron oxide layers formed on the outer surfaces of the hollow fiber membranes after the operation of filtration is stopped when the differential pressure across the filter column 9 reaches a predetermined value through continuation of filtration. Scrubbing according to the present invention is carried out in accordance with the following procedure:

The valves 20 and 24 are closed to keep the lower and upper compartments R and F filled with inflow condensate water and filtrate, respectively, while the valves 22 and 23 are subsequently opened to charge compressed air into the lower compartment R through the compressed air charge piping 15B, thereby initiating the exfoliation and removal of the iron oxide layer 29 easy of exfoliation which includes most of relatively coarse, hard, fine particles. The compressed air is held once beneath the lower surface of the air distributor panel 12 and then passed through small holes (not shown in FIG. 2) opened through the side walls of the bubble distributor tubes 13 to turn into bubbles, which then go up on the insides of the skirts 8 of the hollow fiber membrane modules 1 and subsequently flow into the hollow fiber membrane modules 1 via the apertures 7.

The bubbles going up vibrate the hollow fiber membranes 2 with agitating water in the hollow fiber membrane modules 1 to exfoliate the iron oxide layers 29 formed on the outer surfaces of the respective hollow fiber membranes 2. The exfoliated iron oxide particles are then dispersed in water inside the lower compartment R of the filter column 9.

The bubbles escape out of the hollow fiber membrane modules 1 through their communication ports 6B and are then discharged out of the filter column 9 through the air discharge piping 17.

Since the aforementioned iron oxide layers 29 including relatively coarse, hard, fine particles are relatively easy of exfoliation, the time required for first-stage scrubbing to exfoliate those layers 29 may be at most 3 minutes, usually as short as around one minute, when the flow rate of air used for the above-mentioned scrubbing is the same as that used for second-stage scrubbing, described later in detail, to exfoliate the iron oxide layers 28. It should be noted that chances of collision of the exfoliated, relatively coarse, hard, fine particles against the outer surfaces of the hollow fiber membranes 2 are increased to roughen the outer surfaces of the hollow fiber membranes, as the time of the first-stage scrubbing is prolonged. Where the flow rate of air used for the first stage scrubbing is decreased to, for example, $\frac{1}{4}$ of that used for the second-stage scrubbing, however, the first-stage scrubbing is so mild that the exfoliated, relatively coarse, hard, fine particles may not strongly collide against the outer surfaces of the hollow fiber membranes to permit the first-stage scrubbing to be continued for about 3 to 5 minutes.

Iron oxide particles once contained in the iron oxide layers 29 including relatively coarse, hard, fine particles but exfoliated from the layers 29 through initial stage of scrubbing and then dispersed in water inside the lower compartment R of the filter column 9, when allowed to settle after termination of that scrubbing, fall down to around the upper surfaces of the air distributor panel 12 and the buffle plate 27. Accordingly, even when compressed air is subsequently re-charged into the filter column 9 via the compressed air charge piping 15B to exfoliate the iron oxide layers 28, the compressed air does not fling up the settled iron oxide particles. Alternatively, preliminary drain may be carried out after the initial stage of scrubbing to discharge the iron oxide particles including the relatively coarse, hard, fine particles out of the filter column 9, thereby cutting the time required for settling these particles in the lower compartment.

More specifically, with the valve 23 left open, the valve 22 is closed and the valve 21 is opened to drain, via the drain piping 18, part or all of the waste water containing iron oxide particles dispersed therein and including relatively coarse, hard, fine particles. This step of draining the waste water makes use of a water head. Alternatively, compressed air may be charged into the filter column 9 via the air discharge piping 17, the compressed air charge piping 15B or the water replenishment piping 19 to utilize the pressure of the compressed air to effect quick draining of the waste water.

The foregoing preliminary drain is to drain half or all of the waste water in the lower compartment R. Since the preliminary drain is aimed at removal of relatively coarse, hard, fine particles, however, only half or less of the waste water may be discharged as the blowdown in so far as the relatively coarse, hard, fine particles can be removed.

After the preliminary drain of the waste water resulting from scrubbing, the valve 21 is closed and the valve 26 is opened to feed washing water into the filter column 9 via the water replenishment piping 19 to fill the lower compartment R of the filter column 9 with washing water. Thereafter, the valve 26 is closed, followed by second stage scrubbing to exfoliate iron oxide particles from the iron oxide layer 28.

More specifically, the valves 23 and 22 are opened to charge compressed air into the filter column 9 via the compressed air charge piping 15B to effect second-stage scrubbing. Since this stage of scrubbing is aimed at exfoliation of the iron oxide layers 28 so relatively strongly adhering to the outer surfaces of the hollow fiber membranes that they are hard to exfoliate unless sufficient scrubbing is effected, the scrubbing time should be set in the range of 5 to 30 minutes, usually around 10 minutes, which is longer than the aforementioned first stage scrubbing time. After sufficient scrubbing, the valve 22 is closed to stop feeding of compressed air and the valve 21 is opened with the valve 23 left open to carry out in the conventional manner the drain step of discharging the waste water including the exfoliated fine particles via the drain piping 18.

According to the conventional scrubbing method, only single and uniform scrubbing is effected without discharge of relatively coarse, hard, fine particles exfoliated in the initial stage of the scrubbing step. This results in a liability to roughen the outer surfaces of hollow fiber membranes with relatively coarse, hard, fine particles. In contrast, according to the present invention, outer surface roughening of hollow fiber membranes can be greatly reduced as compared with the conventional scrubbing method since finishing second-stage scrubbing is effected after the first step of exfoliating and removing from the system the iron oxide layer 29 including a large amount of relatively coarse, hard, fine particles causative of roughening the outer surface of porous hollow fiber membranes. Since the second stage scrubbing is effected in substantially the same manner as practiced in the conventional processes, exfoliation of all the remaining particles trapped on the outer surfaces of the hollow fiber membranes can be effectively accomplished.

The foregoing procedure basically involves two stages of scrubbing. The first-stage scrubbing is to initially exfoliate fine particles including relatively coarse, hard, fine particles easy of exfoliation. This may be done at a lower flow rate of scrubbing air and/or for a shorter period of time to prevent the outer surfaces of the hollow fiber membranes from being roughened with the relatively coarse, hard, fine particles. The relatively coarse, hard, fine particles are then removed through settlement thereof and/or preliminary drain of the waste water including the relatively coarse, hard, fine particles, or the like. The second-stage scrubbing is then effceted to exfoliate the hard to exfoliate iron oxide layers 28. Alternatively, the preliminary drain of the waste water including the relatively coarse, hard, fine particles may be effected simultaneously with or in the course of the early stage of the second-stage scrubbing.

[Embodiment 2 according to the Present Invention]

After completion of the filtration, the valves 22 and 23 are opened with the valves 20 and 24 closed to charge compressed air into the lower compartment R via the compressed air charge piping 15B with the lower and upper compartments R and F being filled with condensate water fed thereinto and filtrate, respectively, while at the same time the valve 21 is opened to drain the waste water via the drain piping 18 to effect preliminary drain. With rising bubbles of compressed air charged into the hollow fiber membrane modules 1, the hollow fiber membranes 2 are vibrated with water being agitated in the hollow fiber membrane modules 1 to exfoliate the iron oxide layer 29 formed on the outer surfaces of the hollow fiber membranes 2 and including the relatively coarse, hard, fine particles. The exfoliated iron oxide particles are dispersed in water inside the lower compartment R of the filter column 9, and then discharged afloat on the waste water being drained via the drain piping 18.

The draining rate of the waste water at this stage can be adjusted with the valve 21. For the purpose of preventing the initially exfoliated, relatively coarse, hard, fine particles from causing outer surface roughening of the hollow fiber membranes, the above-mentioned draining rate is preferably adjusted such that the waste water in the lower compartment R is drained therefrom in a relatively short time.

With continuation or discontinuation of inflow of compressed air via the compressed air charge piping 15B, the valve 21 is closed and the valve 26 is opened to feed washing water into the filter column 9 via the water replenishment piping 19 until the lower compartment R is filled with water. Thereafter, the valve 26 is closed to continue scrubbing, which is sufficiently done like in the conventional method for the purpose of exfoliating the hard to-exfoliate iron oxide layer 28 relatively strongly adhering to the outer surfaces of the hollow fiber membranes. After sufficient scrubbing, the valve 22 is closed to discontinue inflow of compressed air. With the valve 23 left open, the valve 21 is opened to take the drain step of draining the waste water including the exfoliated fine particles via the drain piping 18.

The flow rate of scrubbing air during the aforementioned preliminary drain may be decreased in the same manner as described hereinbefore to more effectively prevent the outer surfaces of the hollow fiber membranes from being roughened with the exfoliated relatively coarse, hard, fine particles.

In either the embodiment 1 or 2 according to the present invention, compressed air may be charged into the upper compartment F via the compressed air charge piping 15A before, during or after scrubbing to flow filtrate present inside the upper compartment F backward from the insides of the hollow fibers 2 to the outsides thereof to effect backwash.

As described hereinabove, according to the present invention, since fine particles exfoliated off porous hollow fiber membranes in the initial stage of the scrubbing step are removed through settlement or preliminary drain, the later stage of scrubbing can be effected without relatively coarse, hard, fine particles included in the fine particles and contained in the waste water to thereby effectively avoid occlusion of the pores of the hollow fiber membranes through scrubbing-induced collision of the relatively coarse, hard, fine particles against the outer surfaces of the hollow fiber membranes.

The following Example will now illustrate the present invention to clealy demonstrate the effects thereof. However, they should not be construed as limiting the scope of the invention.

EXAMPLE

About 4,200 hollow fibers having pores of around 0.2 $\mu m$ in diameter, an outer diameter of 1.2 mm, an inner diameter of 0.7 mm and a length of 2.0 m were bundled together inside a cylinder having an inner diameter of 125 mm to form a hollow fiber membrane module as shown in FIG. 1. This hollow fiber membrane module alone was placed in a housing to form a small-scale experimental filter column corresponding to the structure of FIG. 2. The following experiment was carried out using this filter column.

Specifically, raw water containing $\alpha$-$Fe_2O_3$ of 20–40 $\mu m$ in particle size and iron hydroxide of 1–3 $\mu m$ in particle size at a weight ratio of 2:1 was passed through the hollow fiber membranes from the outsides of the hollow fibers to the insides thereof to form iron oxide layers of 15 g as Fe per square meter of membrane, adhering to the outer surfaces of the hollow fibers. After termination of passing raw water, 1 minute of scrubbing was done, followed by draining out of the filter column all the waste water remaining inside the filter column. The filter column was fully filled with washing water, followed by 29 minutes of scrubbing. Thereafter, the waste water was drained out of the filter column. Thereafter, the filter column was fully filled with clean water, followed by passing clear water therethrough. In the course of foregoing procedure, the differential pressure during passing of water was measured across the filter column. The foregoing procedure was repeated 10 times. The increment of differential pressure from the original one after scrubbing of the tenth cycle of the above mentioned procedure was 0.15 $kg/cm^2$.

The hollow fibers were collected from the hollow fiber membrane module after ten cycles of the above-mentioned procedure. The collected hollow fibers were washed with 6N hydrochloric acid for 24 hours. Thereafter, the water permeability of the hollow fiber membranes was examined. A decrease in the water permeability of the hollow fiber membranes from the original one was less than 10%.

Figure 4:
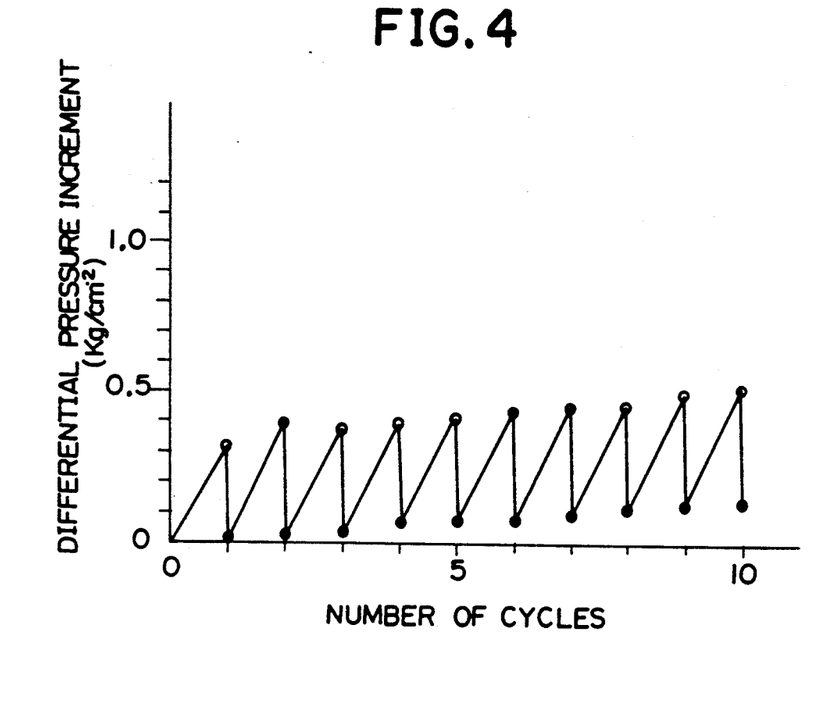
FIG. 4 is a graph illustrating rises in the increment of differential pressure across a filter column from the original one (hereinafter sometimes referred to as "differential pressure increment") through respective operations of filtration and reversions of differential pressure increment through respective operations of scrubbing effected alternately with filtration in Example according to the present invention.

FIG. 4 shows changes in differential pressure after termination of passing raw water as well as after completion of scrubbing, which cover the first to tenth cycles of the above mentioned procedure. In FIG. 4, white circles indicate the increments of differential pressure from the original one after termination of passing raw water, while black circles indicate the increments of differential pressure from the original one after completion of scrubbing.

Comparative Example

Using the same small-scale experimental filter column as used in Example, the same amount of raw water as in Example was passed through hollow fiber membranes from the outsides of the hollow fibers to the insides thereof in the same manner as in Example to form the same amount of iron oxide layers as in Example on the outer surfaces of the hollow fiber membranes. After termination of passing raw water, 30 minutes of scrubbing was carried out with the same amount (flow rate) of air as in Example, followed by draining the waste water out of the filter column. The filter column was re-filled with water, followed by passing clear water through the hollow fiber membranes from the outsides of the hollow fibers to the insides thereof. The foregoing procedure was repeated 10 times In the course of the foregoing procedure, the differential pressure during passing of water was measured. The increment of differential pressure from the original one after scrubbing of the tenth cycle of the above-mentioned procedure was 0.4 $kg/cm^2$.

The hollow fibers were collected from the hollow fiber membrane module after ten cycles of the above-mentioned procedure. The collected hollow fibers were washed with 6N hydrochloric acid for 24 hours. Thereafter, the water permeability of the hollow fiber membranes was examined. A decrease in the water permeability of the hollow fiber membranes from the original one was 30%.

Figure 5:
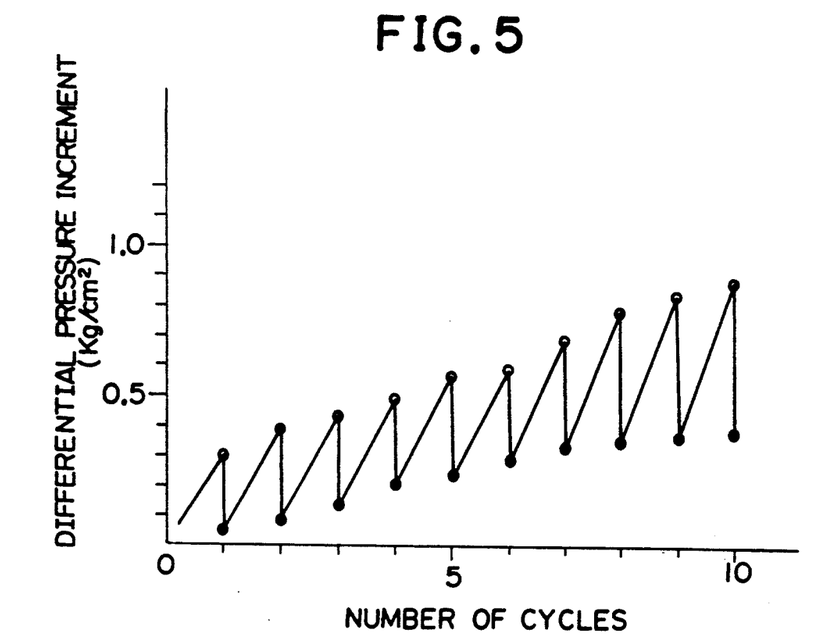
FIG. 5 is a graph illustrating rises in differential pressure increment through respective operations of filtration and reversions of differential pressure increment through respective operations of scrubbing effected alternately with filtration in Comparative Example.

FIG. 5 shows changes in differential pressure after termination of passing raw water as well as after completion of scrubbing, which cover the first to tenth cycles of the above-mentioned procedure. In the figure, white circles indicate the increments of differential pressure from the original one after termination of passing raw water, while black circles indicate the increments of differential pressure from the original one after completion of scrubbing.

What is claimed is:

1. A plural stage process for scrubbing including sequentially removing an outer layer of easier to remove particles from porous hollow fiber membranes fouled by power plant water in a hollow fiber membrane module including a large number of hollow fibers bundled together therein as said porous hollow fiber membranes: comprising the filtration step of passing raw water containing fine particles through the pores of said hollow fibers from the outsides thereof to the insides thereof to trap said fine particles on the outer surfaces of said hollow fibers while draining filtrate obtained on the insides of said hollow fibers out of said hollow fiber membrane module, the scrubbing step of charging bubbles into water around the outer surfaces of said hollow fibers dipped in water to agitate said water around the outer surfaces of said hollow fibers to vibrate said hollow fibers, thereby exfoliating said fine particles trapped on the outer surfaces of said hollow fibers, and the drain step of draining the resulting waste water containing the exfoliated fine particles out of said hollow fiber membrane module;

wherein fine particles exfoliated off the outer surfaces of said hollow fibers in the initial stage of said scrubbing step are removed before further continuation of said scrubbing step.

2. A process for scrubbing porous hollow fiber membranes in a hollow fiber membrane module as claimed in claim 1, wherein said hollow fiber membrane module is disposed along with at least one hollow fiber membrane module of the same kind as described above in a hollow fiber membrane filter column while being hung from a module support partitioning the inside of said hollow fiber membrane filter column into an upper compartment, from which the filtrate drained out of the hollow fiber membrane modules is discharged out of said filter column, and a lower compartment, into which said raw water is flowed before passed through the pores of said hollow fibers and from which the waste water drained out of the hollow fiber membrane modules is discharged out of said filter column.

3. A process for scrubbing porous hollow fiber membranes in a hollow fiber membrane module as claimed in claim 1, wherein the removal of said fine particles exfoliated in the initial stage of said scrubbing step is effected through settlement thereof.

4. A process for scrubbing porous hollow fiber membranes in a hollow fiber membrane module as claimed in claim 1, wherein the removal of said fine particles exfoliated in the initial stage of said scrubbing step is effected through preliminary drain of part or all of waste water resulting from the scrubbing and containing said fine particles exfoliated.

5. A process for scrubbing porous hollow fiber membranes in a hollow fiber membrane module as claimed in claim 1, wherein the amount of said bubbles to be charged is reduced in the initial stage of said scrubbing step.

6. A plural stage process for scrubbing including sequentially removing an outer layer of easier to remove particles and then an inner layer of harder to remove particles from porous hollow fiber membranes fouled by power plant water in a hollow fiber membrane module including a large number of hollow fibers bundled together therein as said porous hollow fiber membranes: comprising the filtration step of passing raw water containing fine particles through the pores of said hollow fibers from the outsides thereof to the insides thereof to trap said fine particles on the outer surfaces of said hollow fibers while draining filtrate obtained on the insides of said hollow fibers out of said hollow fiber membrane module, the scrubbing step of charging bubbles into water around the outer surfaces of said hollow fibers dipped in water to agitate said water around the outer surfaces of said hollow fibers to vibrate said hollow fibers, thereby exfoliating said fine particles trapped on the outer surfaces of said hollow fibers, and the drain step of draining the resulting waste water containing the exfoliated fine particles out of said hollow fiber membrane module;

wherein the preliminary drain step of draining waste water containing fine particles exfoliated off the outer surfaces of said hollow fibers in the initial stage of said scrubbing step is added in the course of said scrubbing step to simultaneously effect scrubbing of said porous hollow fiber membranes and drain of said waste water in the initial stage of said scrubbing step.

7. A process for scrubbing porous hollow fiber membranes in a hollow fiber membrane module as claimed in claim 6, wherein said hollow fiber membrane module is disposed along with at least one hollow fiber membrane module of the same kind as described above in a hollow fiber membrane filter column while being hung from a module support partitioning the inside of said hollow fiber membrane filter column into an upper compartment, from which the filtrate drained out of the hollow fiber membrane modules is discharged out of said filter column, and a lower compartment, into which said raw water is flowed before passed through the pores of said hollow fibers and from which the waste water drained out of the hollow fiber membrane modules is discharged out of said filter column.

8. A process for scrubbing porous hollow fiber membranes in a hollow fiber membrane module as claimed in claim 6, wherein the amount of said bubbles to be charged is reduced during the course of said preliminary drain step.

* * * * *

UNITED STATES PATENT AND TRADEMARK OFFICE
CERTIFICATE OF CORRECTION

PATENT NO. : 5,209,852

DATED : May 11, 1993

INVENTOR(S) : Sunaoka et al.

It is certified that error appears in the above-identified patent and that said Letters Patent is hereby corrected as shown below:

Col. 10, line 45    Delete " hard to-exfoliate " and substitute -- hard-to-exfoliate --

Col. 12, line 38    After " particles " insert -- and then an inner layer of harder to remove particles --

Signed and Sealed this

Tenth Day of May, 1994

*Attest:*

BRUCE LEHMAN

*Attesting Officer*    *Commissioner of Patents and Trademarks*